(12) United States Patent
Zhao

(10) Patent No.: US 8,213,506 B2
(45) Date of Patent: Jul. 3, 2012

(54) VIDEO CODING

(75) Inventor: David Zhao, Solna (SE)

(73) Assignee: Skype, Dublin (IE)

( * ) Notice: Subject to any disclaimer, the term of this patent is extended or adjusted under 35 U.S.C. 154(b) by 365 days.

(21) Appl. No.: 12/584,579

(22) Filed: Sep. 8, 2009

(65) Prior Publication Data

US 2011/0058607 A1 Mar. 10, 2011

(51) Int. Cl.
*H04N 7/12* (2006.01)

(52) U.S. Cl. ............................ 375/240.12; 375/240.26

(58) Field of Classification Search ...... 375/240–240.29
See application file for complete search history.

(56) References Cited

U.S. PATENT DOCUMENTS

| | | | |
|---|---|---|---|
| 5,875,304 A | 2/1999 | Winter et al. | |
| 6,907,073 B2 | 6/2005 | Sawhney et al. | |
| 7,356,587 B2 | 4/2008 | Boulanger et al. | |
| 7,974,341 B2 * | 7/2011 | Chen et al. | 375/240.1 |
| 2002/0071027 A1 * | 6/2002 | Sugiyama et al. | 348/14.09 |
| 2002/0071485 A1 * | 6/2002 | Caglar et al. | 375/240.01 |
| 2004/0008780 A1 * | 1/2004 | Lai et al. | 375/240.16 |
| 2005/0249285 A1 * | 11/2005 | Chen et al. | 375/240.16 |
| 2006/0146934 A1 * | 7/2006 | Caglar et al. | 375/240.12 |
| 2006/0224760 A1 | 10/2006 | Yu et al. | |
| 2009/0327918 A1 | 12/2009 | Aaron et al. | |
| 2010/0226436 A1 * | 9/2010 | Dane et al. | 375/240.16 |

FOREIGN PATENT DOCUMENTS

| | | |
|---|---|---|
| JP | 2003143180 A | 5/2003 |
| WO | WO 00/38330 A1 | 6/2000 |
| WO | WO 03/084244 A1 | 10/2003 |
| WO | WO 2004/110018 A1 | 12/2004 |
| WO | WO 2005/009019 | 1/2005 |

OTHER PUBLICATIONS

PCT Notification of Transmittal of the International Search Report and the Written Opinion of the International Searching Authority, or the Declaration, PCT/EP2010/063193, Date of Mailing: Oct. 29, 2010, 19 pp.

Farber, N., et al., "Robust H.263 Compatible Transmission for Mobile Video Server Access," *Wireless Image/Video Communications 1996*, First International workshop on Loughborough, UK, Sep. 4-5, 1996, New York, NY, USA, IEEE, US NNKD-DOI: 10.1109/WIVC.1996.624635, pp. 8-13.

Farber, N., et al., "Robust H.263 Compatible Video Transmission for Mobile Access to Video Servers," *International Workshop on Wireless Image/Video Communications*, XX, XX, vol. 2, pp. 73-76 (Jan. 1, 1997).

(Continued)

*Primary Examiner* — Hong Cho
(74) *Attorney, Agent, or Firm* — Wolfe-SBMC

(57) ABSTRACT

A method of transmitting video, a method of receiving and decoding video, and a corresponding transmitter, receiver and computer program products. The method of transmitting video to one or more recipient terminals comprises: transmitting a stream of inter frame encoded video data to a recipient terminal; during ongoing transmission of the stream to the recipient terminal, receiving a request signal from that recipient terminal; and in response to the request signal, transmitting alternatively encoded video data to the recipient terminal in association with the inter frame encoded video data.

33 Claims, 7 Drawing Sheets

OTHER PUBLICATIONS

"Digital Enhanced Cordless Telecommunications (DECT); New Generation DECT; Overview and Requirements; ETSI TR 102 570," *ETSI Standards*, LIS, Sophia Antipolis Cedex, France, vol. DECT, No. V1.1.1, pp. 1-17, (Mar. 1, 2007).

Karczewicz, M. and Kureeren, R., "The SP- and SI-Frames Design for H.264/AVC," *IEEE Transactions on Circuits and Systems for Video Technology*, vol. 13, No. 7, pp. 637-644, (Jul. 2003).

Fan, X., et al., "Transcoding Based Robust Streaming of Compressed Video," *IEEE*, International Conference on Acoustics, Speech and Signal Processing (ICASSP) 2009, pp. 909-912 (Apr. 19-24, 2009).

Wiegand, T., Sullivan, G. J., Bjontegaard, G., and Luthra, A., "Overview of the H.264/AVC Video Coding Standard," *IEEE Transactions on Circuits and Systems for Video Technology*, vol. 13, Issue 7, pp. 560-576 (Jul. 2003).

Search Report for GB0922057.5, date of search: Apr. 15, 2011 (1 page).

Notification of Transmittal of the International Search Report and the Written Opinion of the International Searching Authority, or the Declaration for PCT/EP2010/069899, date of mailing: Mar. 21, 2011 (12 pages).

Hossain, et al., "Minimizing Rate Distortion in Peer-to-Peer Networking," IEEE, pp. 1-5 (2009).

Akabri, et al., "Packet Loss Recovery Schemes for Peer-to-Peer Video Streaming," Network and Services, IEEE, p. 94 (2007).

Noh, et al., "Stanford Peer-to-Peer Multicast (SPPM)—Overview and Recent Extensions," IEEE, pp. 1-4 (2009).

Jinfeng, et al., "Adaptive Video Streaming over P2P Multi-Hop Path," Advanced Information Networking and Applications Workshops, IEEE, pp. 160-165 (2007).

Kho, et al. "Skype Relay Calls: Measurements and Experiments," Computer Communications Workshops IEEE, pp. 1-6 (2008).

\* cited by examiner

VIDEO CODING

FIELD OF THE INVENTION

The present invention relates to the transmission of encoded video streams by means of inter-frames and intra-frames or such like.

BACKGROUND

Video coding commonly uses two types of video frames: intra-frames, also known as key frames in a conventional context; and inter-frames. An intra-frame is compressed using only the current video frame, i.e. intra-frame prediction, similarly as in static image coding. An inter-frame on the other hand is compressed using the knowledge of one of the previously decoded frame, and allows for much more efficient compression when the scene has relatively little changes. Inter-frame coding is particularly efficient for, e.g., talking-head with static background, typical in video conferencing. Depending on the resolution, frame-rate, bit-rate and scene, an intra-frame can be up to 20-100 times larger than an inter-frame. On the other hand, an inter-frame imposes a dependency relation to previous inter-frames up to the most recent intra-frame. If any of those frames are missing, decoding the current inter-frame may result in errors and artifacts.

These techniques are used in, e.g., the H.264/AVC standard (see T. Wiegand, G. J. Sullivan, G. Bjontegaard, A. Luthra: "Overview of the H.264/AVC video coding standard," in IEEE Transactions on Circuits and Systems for Video Technology, Volume: 13, Issue: 7, page(s): 560-576, July 2003).

Frequent and periodic transmission of intra-frames a.k.a. key frames is common in video streaming. This is illustrated schematically in FIG. 1, where key frames 1, 5, 9 and 13 etc. (shown black) are interleaved periodically between the transmission of inter-frames 2-4, 6-8, 10-12 and 14-16 etc. (shown white). The key frames are needed for two main reasons. Firstly, when a new user joins the session, he/she can only start decoding the video when a key-frame is received. Secondly, on packet loss, particularly bursty packet loss, the key-frame is a way to recover the lost coding state for proper decoding. The key frames allow the receiver to periodically update with "absolute" data, not relying on encoding relatively to previous frames, thus avoiding errors that could otherwise propagate due to packet loss occurs. However, the larger sizes of key frames incur a larger bandwidth for transmission. It would be desirable to try to mitigate this problem to some extent.

SUMMARY

According to one aspect of the present invention, there is provided a method of transmitting video to one or more recipient terminals, the method comprising: transmitting a stream of inter frame encoded video data to a recipient terminal; during ongoing transmission of the stream to the recipient terminal, receiving a request signal from that recipient terminal; and in response to the request signal, transmitting alternatively encoded video data to the recipient terminal in association with the inter frame encoded video data.

Preferably the alternatively encoded video data is intra frame encoded video data.

Thus the present invention advantageously allows alternatively encoded data such as intra frame encoded data to be transmitted "on demand". This means that intra frame data need not necessarily be transmitted with any particular predetermined or autonomously determined regularity from the transmitter, but rather as and when required by the recipient. This allows a reduction in the amount of intra frame data that needs to be transmitted, resulting in better compression of the transmitted video and therefore incurring less bandwidth.

In fact, preferably no periodic transmission of intra frame data is required at all, nor any autonomous transmission of intra frame data from the transmitter.

Therefore in preferred embodiments, the stream of inter frame encoded video data may be transmitted substantially without periodic transmission of intra frame encoded video data. The intra frame encoded video data may be transmitted to each of the one or more recipient terminals only in response to a request signal from the respective recipient terminal and at the beginning of the stream.

Furthermore, the present invention has a particularly advantageous application to multi-recipient video, where excessive transmission of intra frames to multiple parties would place a particularly high bandwidth burden on the transmission medium. Instead, according to embodiments of the present invention, intra frame data can be transmitted to each individual recipient as and when required by the respective recipient.

Therefore in a preferred application of the present invention, the method may comprise: transmitting the stream of inter frame encoded data to multiple recipient terminals; during ongoing transmission of the stream to the recipient terminals, receiving a respective request signal from each of those multiple recipient terminals; and in response to each of the request signals, transmitting alternatively encoded video to the respective recipient terminal in association with the inter frame encoded video data.

In further embodiments, the method may comprise: during ongoing transmission of the stream to each of the one or more recipient terminals, receiving a respective plurality of request signals at different times from each of the one or more recipient terminals; and in response to each of those request signals, transmitting alternatively encoded video to the respective recipient terminal in association with the inter frame encoded video data.

The alternatively encoded video data may be transmitted in parallel with the stream of inter frame encoded video data.

The request signal may indicate that the respective recipient terminal has failed to receive a portion of the inter frame encoded video data.

The method may comprise: receiving a request from a further terminal to join the stream; and in response, transmitting the stream of inter frame encoded video data and an initial portion of intra frame encoded video data to the further terminal.

The method may comprise: generating a first stream and parallel second stream, the first stream comprising a plurality of frames of inter frame encoded video data and no more than one frame of intra frame data, and the second stream comprising a plurality of frames of intra frame encoded video data; wherein said transmission of the stream of inter frame encoded video data may comprise transmitting the first stream, and said transmission of the intra frame encoded video data may comprise transmitting selected frames of the second stream.

Each of the frames of intra frame data in the second stream may be substantially equivalent, when decoded, to a respective corresponding one of the frames of inter frame data in the first stream.

Each of the frames of intra frame data in the second stream may be bitwise exact, when decoded, to a respective corresponding one of the frames of inter frame data in the first stream.

There may be fewer frames of the first stream per unit time than frames of the first stream.

The transmission of the inter frame encoded video data and the alternatively encoded video data may be over a packet-based communication network.

The packet-based communication network may comprise the internet.

The method may comprise establishing a connection with the recipient terminal over said packet-based communication network using a peer-to-peer communication system, wherein the inter frame encoded video data and alternatively encoded video data is transmitted over said peer-to-peer established connection.

According to another aspect of the present invention, there is provided computer program product for transmitting video to one or more recipient terminals, the program product comprising code embodied on a computer-readable medium and configured so as when executed on a processor to: transmit a stream of inter frame encoded video data to a recipient terminal; during ongoing transmission of the stream to the recipient terminal, receive a request signal from that recipient terminal; and in response to the request signal, transmit alternatively encoded video data to the recipient terminal in association with the inter frame encoded video data.

According to another aspect of the present invention, there is provided a transmitter for transmitting video to one or more recipient terminals, the transmitter comprising: a transceiver arranged to transmit a stream of inter frame encoded video data to a recipient terminal and, during ongoing transmission of the stream to the recipient terminal, to receive a request signal from that recipient terminal; and an encoder coupled to the transceiver and configured to transmit, in response to the request signal, alternatively encoded video data to the recipient terminal in association with the inter frame encoded video data.

In embodiments, the transmitting computer program product or transmitter may be further configured in accordance with any of the above method steps.

According to a further embodiment of the present invention, there is provided a method of decoding received video, the method comprising: receiving a stream of inter frame encoded video data transmitted from a transiting terminal; during ongoing receipt of the stream from the transmitting terminal, sending a request signal to that transmitting terminal; in response to the request signal, receiving back alternatively encoded video data from the transmitting terminal in association with the inter frame encoded video data; and decoding the received video using the inter frame encoded video data in association with the alternatively encoded video data, and outputting the decoded video to an output device.

Again, preferably said alternatively encoded video data is intra frame encoded video data.

In embodiments, the sending of said request signal may be triggered by failing to receive a portion of inter frame encoded data from the transmitting terminal.

According to another aspect of the present invention, there is a provided computer program product for decoding received video, the program product comprising code embodied on a computer-readable medium and configured so as when executed on a processor to: receive a stream of inter frame encoded video data transmitted from a transiting terminal; during ongoing receipt of the stream from the transmitting terminal, send a request signal to that transmitting terminal; and in response to the request signal, receive back alternatively encoded video data from the transmitting terminal in association with the inter frame encoded video data; and decode the received video using the inter frame encoded video data in association with the alternatively encoded video data, and output the decoded video to an output device.

According to another aspect of the present invention, there is provided a receiver for decoding received video, the receiver comprising: a transceiver arranged to receive a stream of inter frame encoded video data transmitted from a transiting terminal; and a decoder coupled to the transceiver and configured to send, during ongoing receipt of the stream from the transmitting terminal, a request signal to that transmitting terminal; wherein the transceiver is arranged to receive back, in response to the request signal, alternatively encoded video data from the transmitting terminal in association with the inter frame encoded video data; and the decoder is configured to decode the received video using the inter frame encoded video data and alternatively encoded video data, and output the decoded video to an output device.

In embodiments, the receiving computer program product or receiver may be further configured such that said alternatively encoded video data is intra frame encoded video data, and/or that the sending of said request signal is in triggered by failing to receive a portion of inter frame encoded data from the transmitting terminal.

BRIEF DESCRIPTION OF THE DRAWINGS

For a better understanding of the present invention and to show how it may be carried into effect, reference will now be made by way of example to the accompanying drawings in which.

DETAILED DESCRIPTION OF PREFERRED EMBODIMENTS

Figure 2:
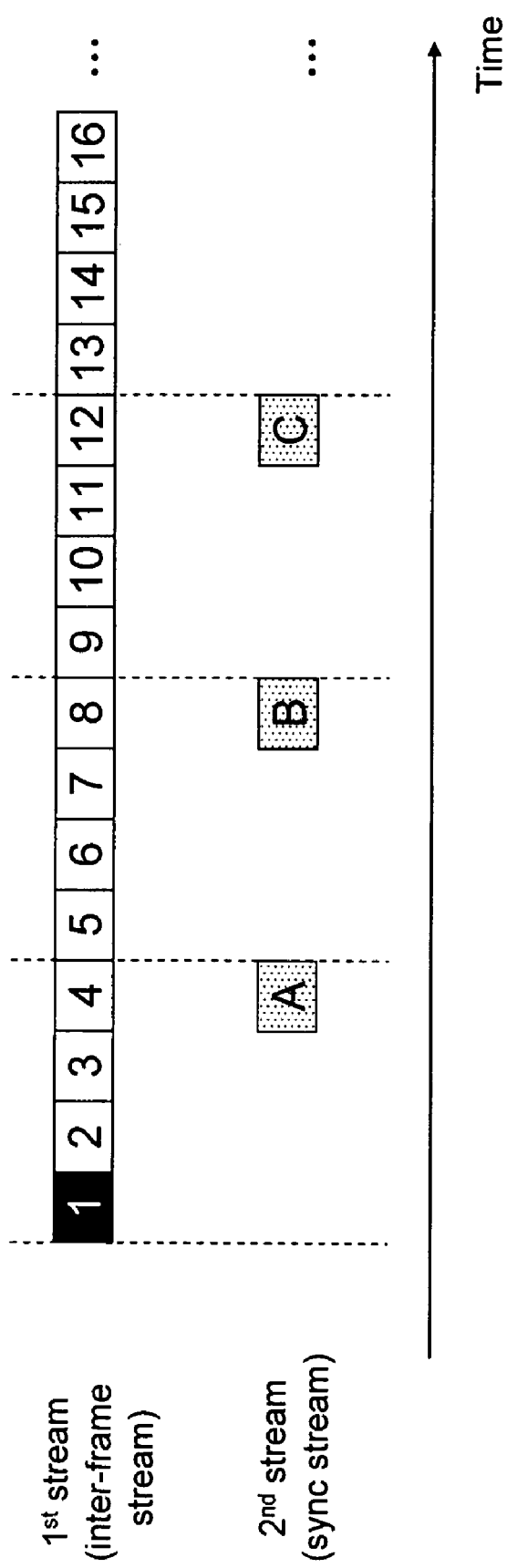
FIG. 2 is a schematic representation of a pair of streams comprising an inter-frame stream and a sync frame stream.
Figure 5:
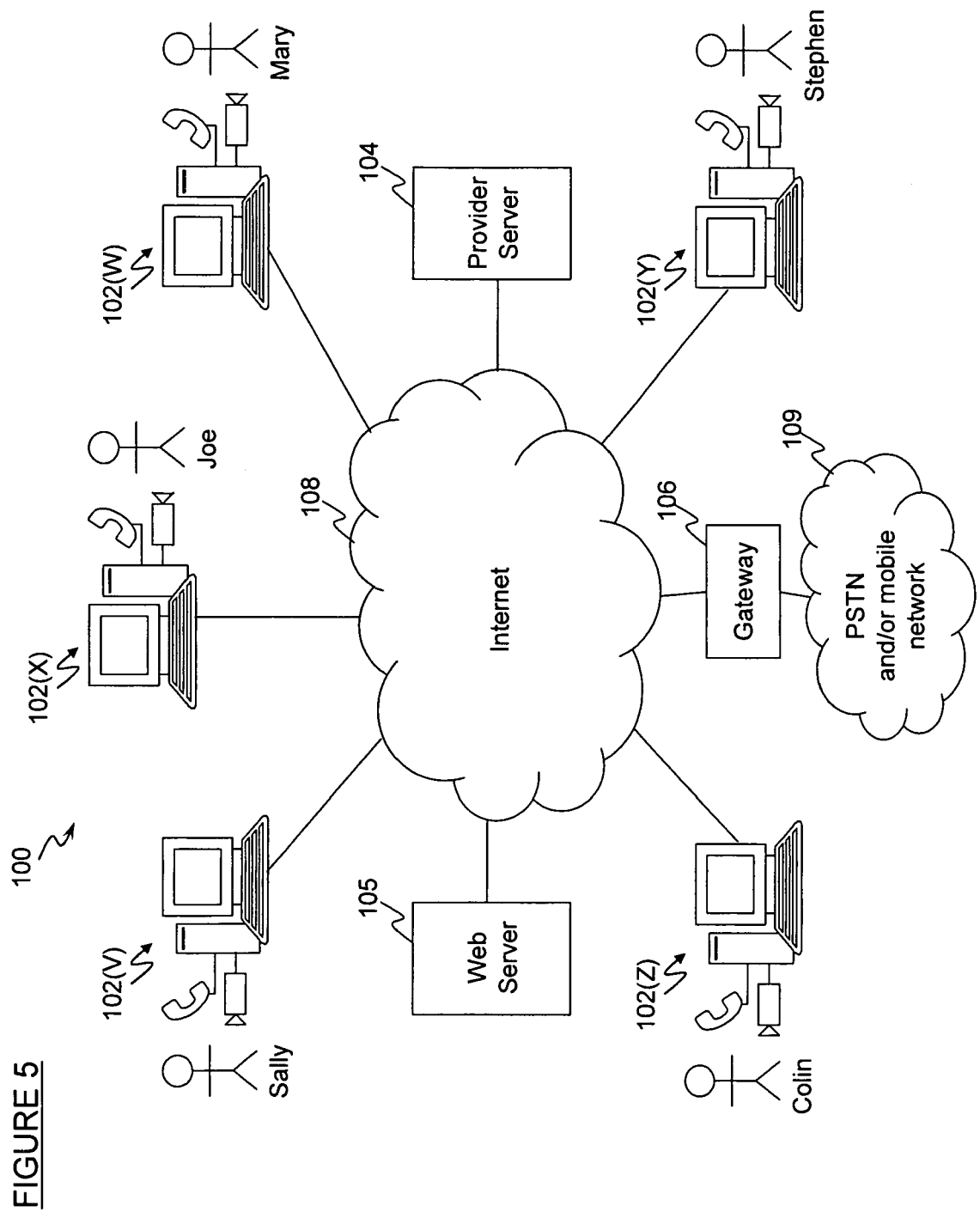
FIG. 5 is a schematic representation of a packet-based network such as the Internet.
Figure 7A:
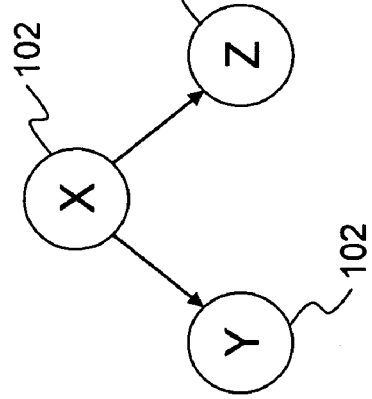
FIGS. 7a-7e schematically illustrate examples for routing a video stream between nodes of a communication system.

A preferred embodiment of the present invention is now described in relation to FIGS. 2, 5 and 7a.

For the sake of example, suppose a transmitting terminal 102(X) is to transmit a video stream to a recipient terminal 102(Y). The video stream is preferably live, transmitted in real time, e.g. in the case of a video call. Details of preferred implementations and examples of different routing options will be discussed later in relation to FIGS. 5, 6 and 7a-7e, but the principle applies to any transmitter such as 102(X) transmitting any video to any receiving terminal such as 102(Y) and/or 102(Z) by any suitable route. Terminals 102(X), 102(Y) and 102(Z) may be referred to as X, Y and Z for brevity.

Two separate, parallel streams are generated at the transmitting terminal 102(X): a first stream and a second stream. As illustrated schematically in FIG. 2, the first stream comprises an initial key frame 1 (shown black), followed only by sequence of contiguous inter-frames 2-16, etc. (shown white) and no further key frames. The second stream may be referred to herein as the "sync stream", comprising a plurality of "sync-frames" A, B, C, etc. (shown dotted).

Figure 1:
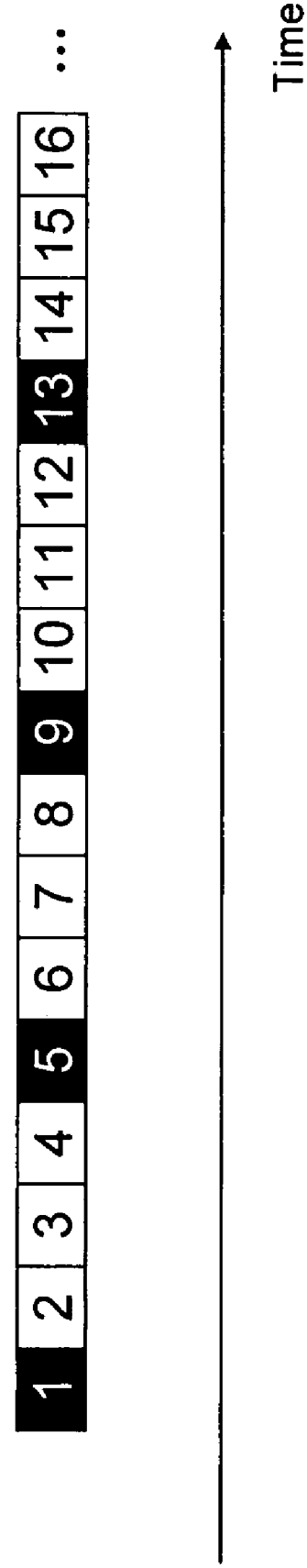
FIG. 1 is a schematic representation of a video stream comprising inter-frames and key frames.

The idea of the sync-frames is to decouple the dependency on the past frames without needing to interleave multiple key-frames into the first stream, as would have been required in previously as illustrated in FIG. 1.

As mentioned, and as will be familiar to a person of ordinary skill in the art, an inter-frame is encoded relative to a preceding frame and takes fewer bits to encode; whereas a intra-frame is encoded in an absolute manner, relative only to other data in the same frame representing the same moment in time, therefore requiring more bits to encode. That is to say, an inter-frame requires a preceding frame in order to decode, whilst an intra-frame is independently decodable.

Therefore the first stream requires an initial intra frame 1—a key-frame—relative to which the subsequent inter-frames 2-16 and onwards are encoded, i.e. in order for those inter frames to be meaningfully defined. When the transmitting terminal X first begins transmitting to the recipient terminal Y, it begins the stream with the initial key-frame 1. However, following the initial key-frame 1, no further key-frames are generated or transmitted as part of the first stream.

In principle, this would be sufficient for the recipient Y to continue to decode the stream indefinitely, assuming perfect encoding and a lossless channel. However, in reality errors will occur due to packet-loss or otherwise, in which case the meaning of inter-frames relative to previous frames becomes distorted, e.g. resulting in artifacts. This is why prior techniques as illustrated in FIG. 1 would have periodically interleaved intra-frames in the form of key-frames into the stream, so that at intervals the recipient Y could reset its decoding with a new, internally defined, independently decodable, absolute frame.

According to preferred embodiments of the present invention on the other hand, the transmitter X instead only transmits an intra frame on demand, in the form of a separate sync frame which is selectively transmitted from the generated sync stream as and when the transmitter X receives a corresponding request signal from the recipient Y. Use of key frames in the first, inter-frame stream is deliberately avoided except for the initial frame 1. The coding efficiency is therefore higher compared to the traditional approach of frequent key-frames.

Note that, due to the explicit dependency on past decoded frames, the first stream is only useful by itself if the whole stream is available since its start. If an additional new recipient terminal Z joins the stream therefore, it must first request to receive both the first, inter-frame stream and the second, sync stream. Upon the receiving of the next sync-frame, the first video stream becomes decodable. The new recipient Z then stops requesting the sync-frame stream. From this point on, the new recipient receives video through the first, inter-frame stream only, until an un-recoverable packet loss occurs. The new recipient Z can then requests the sync-frame stream again, and waits for a new sync-frame so that it can continue decoding the first, inter-frame video stream.

The second, sync-frame stream removes the dependency of the history. A sync-frame works similarly to a key-frame as it is required to be independently decodable. On a point of terminology therefore, note that the terms "sync-frame" and "key frame" as used herein both refer to types of intra-frame. The difference is when and on what condition they transmitted: key-frames according to existing techniques are scheduled intra-frames, transmitted periodically and unconditionally; whilst sync-frames on the other hand are intra-frames available to be transmitted "on demand", as and when requested by a recipient such as Y or Z.

Further, according to preferred embodiments of the present invention, an additional requirement may be imposed on sync-frames. That is, the decoded image of each sync-frame is preferably required to be bit-wise exact to that of a respective one corresponding inter-frame. For instance, referring to FIG. 2, the decoded image from frame B must be exactly the same as the decoded frame 8 (when frames 1-7 are properly decoded). The sync-frame stream may generate sync-frames repeatedly. However, the sync stream needs to be transmitted only to the receivers who cannot decode the first video stream, e.g. due to packet loss or recent participation.

A sync-frame such as A, B, C, etc. may be said to be generated and/or transmitted in parallel to the inter-frame stream in the sense that—instead of being interleaved in place of a corresponding inter frame such as 4, 8, 12, etc. relating to a corresponding time in the video—it is generated and/or transmitted in addition to a corresponding inter frame representing the same image at corresponding time in the video.

Separation of the video into the first stream and second sync stream allows more flexible ways of distributing video. For instance, still referring to FIG. 2, following sequences of video frames are decodable:

(i) A-1-2-3-4-5-6-7-8-9-10-11-12-13-14-15-16,
(ii) B-5-6-7-8-9-10-11-12-13-14-15-16,
(iii) C-9-10-11-12-13-14-15-16,
(iv) D-13-14-15-16,
(v) A-1-2-3-4-packet loss-C-9-10-11-12-13-14-15-16, etc.

This is particularly useful in video streaming to multiple recipients, where packet loss may occur independently for each different receiver. One main advantage of this scheme is in a multi receiver video conferencing or streaming application, so that periodic transmission of key-frames to all receivers can be avoided. The removal of key-frames reduces bit-rate without affecting the decoding quality. The key-frames are transmitting only to receivers who actively request them. Overall, this leads to more efficient utilization of bandwidth An example implementation is now discussed in relation to FIGS. 3 and 4.

Figure 3:
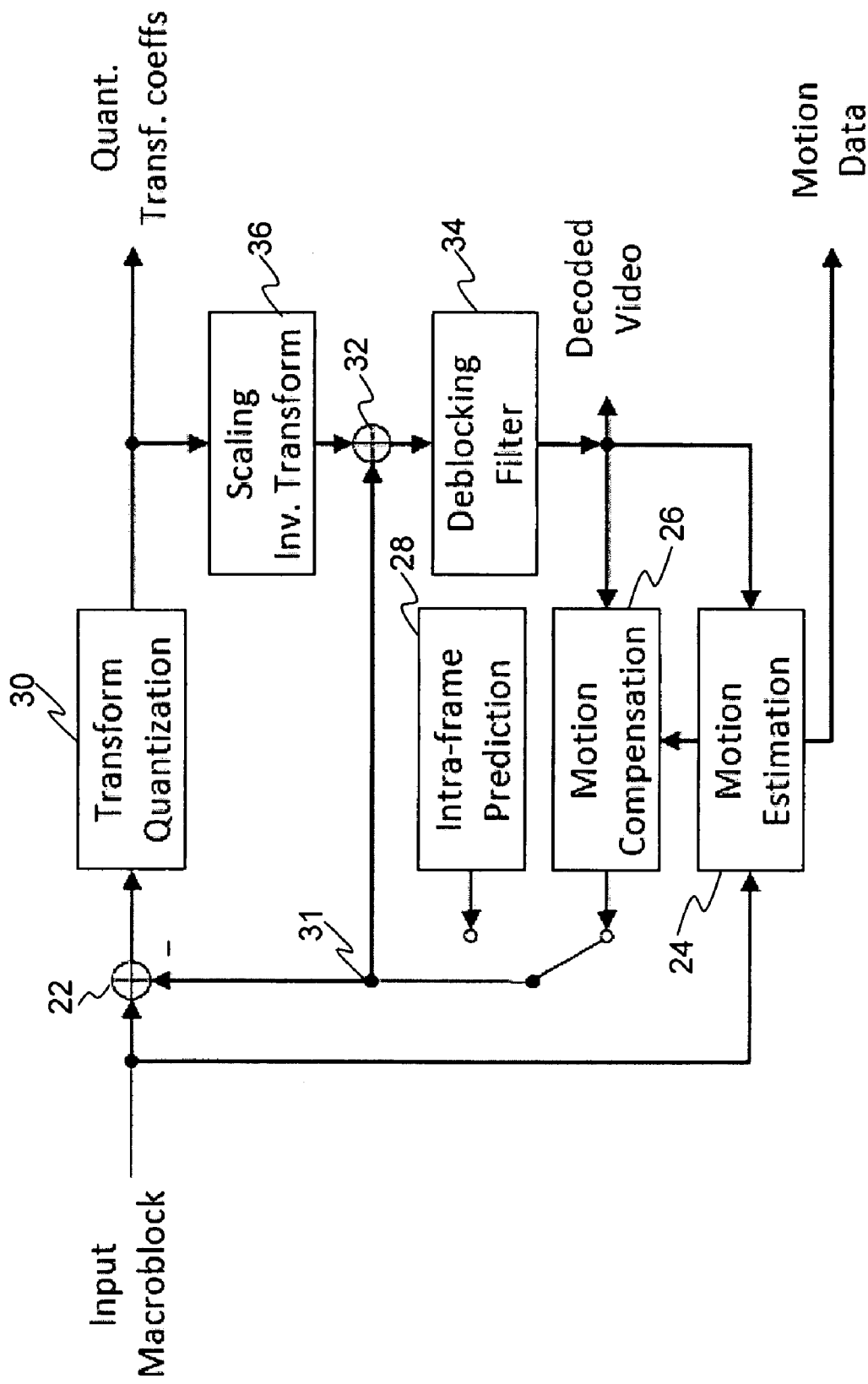
FIG. 3 is a schematic block diagram of a video encoder for outputting a stream as shown in FIG. 1.

A standard video codec for encoding a conventional stream of inter-frames and interleaved key-frames, as in FIG. 1, is first described in relation to FIG. 3. This shows the basic coding structure of H.264/AVC as cited above. This outputs quantized transformation coefficients and motion data which can then be transmitted to the decoder.

The video encoder of FIG. 3 comprises a first subtraction stage 22, a motion estimation module 24, a motion compensation module 26, an intra-frame prediction module 28, a first transformation quantization module 30, a first addition stage 32, a first deblocking filter module 34, a first scaling inverse transform module 36, and a switch node 31. Each of these components is preferably implemented in software stored on a memory of the transmitting terminal 102(X) and executed on a processor of that terminal, but the option is not excluded of some or all of these components being in part or in whole implemented in dedicated hardware.

The first subtraction stage 22 is arranged to receive an input signal comprising a series of input macroblocks each corresponding to a portion of a frame. The motion estimation module 24 also has an input arranged to receive the same series of macroblocks. The other input of the first subtraction stage 22 is coupled to the switch node 31, which is switchably coupleable between the output of either of the intra-frame prediction module 28 and the motion compensation module 26 at any one time. The output of the first subtraction stage is coupled to the input of the firsts transform quantization module 30, whose output is arranged to supply quantized transform coefficients as part of the encoded video signal for transmission to the one or more recipient terminals 102(Y), 102(Z) etc. The output of the first transform quantization module 30 is also fed back, being coupled to the input of the first scaling inverse transform module 36. The output of the first scaling inverse transform module 39 is coupled to an input of the first addition stage 32. The other input of the first addition stage 32 is coupled to the switch node 31, so as to be switchably coupled to the output of the motion compensation module 26 whenever the first subtraction stage 22 is also. The output of the first addition stage 32 is coupled to the input of the first deblocking filter 34. The output of the first deblocking filter 34 is arranged to supply motion estimation as part of the encoded video signal for transmission to the one or more recipient terminals 102(Y), 102(Z) etc. The output of the first deblocking filter 34 is also fed back, being coupled to an input of each of the motion estimation module 24 and the motion compensation module 36.

In operation, the first subtraction stage 22 produces a difference signal representing the difference between the input signal and the output of either the intra-frame prediction module 28 (when performing intra-frame encoding data) or the motion compensation module 26 (when performing inter-frame data). The first transform quantization block 30 quantizes this difference signal, thus generating quantized transform coefficients for output in the encoded video signal for transmission to a recipient terminal 102(Y), 102(Z), etc.

The key-frames are generated by intra-frame encoding, which is a form of static image compression within a frame. When performing intra-frame encoding, the idea is to only encode and transmit a measure of how a portion of image data within a frame differs from another portion within that same frame, the prediction being based on a correlation between the portions. The same prediction process can be done at the decoder (given some absolute data), and so it is only necessary to transmit the difference between the prediction and the actual data, rather than the actual data itself. The difference signal is typically smaller in magnitude, so takes fewer bits to encode.

In the case of inter-frames, the motion compensation module 26 is switched in in place of the intra-frame prediction module 28, and a feed back loop is thus created between blocks of one frame and another, in order to encode the inter-frame relative to those of a preceding frame. This takes even fewer bits to encode than an intra-frame.

For inter-frame encoding, the coefficients output by the first transform quantization module are fed back to the first scaling inverse transform module 36, which turns the coefficients back into a version of the difference signal but including the effect of having been quantized. The output of the motion compensation module 26 is added back onto the output of the first scaling inverse transform module 36 at the first addition stage 36, and the result is passed through the first deblocking filter 34. A deblocking filter is used to mitigate the effect of blocking within a frame by smoothing the abrupt edges which can form between blocks.

The overall effect of the first scaling inverse transform block 36, first addition stage 32 and first deblocking filter 34 is to recreate a decoded video signal as it would appear when decoded at the recipient terminal 102(Y) or 102(Z), etc.

This decoded video signal is the supplied to inputs of the motion compensation module 26 and motion estimation module 24. The motion estimation module 26 also receives the input signal. It then performs a motion estimation using the two, by generating motion vectors that represent a transformation due to movement between the previous frame of the decoded video signal and the current frame of the input signal. The motion vectors are supplied to the motion compensation module 26, and also output as part of the encoded video signal for transmission to a recipient terminal 102(Y) or 102(Z), etc.

The motion compensation module 26 then works by applying the motion vectors to the current frame to try to predict the transformation to the next frame. This is used to produce the difference signal, which in the case of inter-frame encoding represents how the predicted inter-frame deviates the actual inter-frame data. The first transform quantization module 30 quantizes this difference for output as part of the encoded video signal along with the motion estimation vectors, and the decoder at the recipient terminal can then decode the inter-frame using the same motion estimation process along with the decoded deviation from this motion-based prediction.

Figure 4:
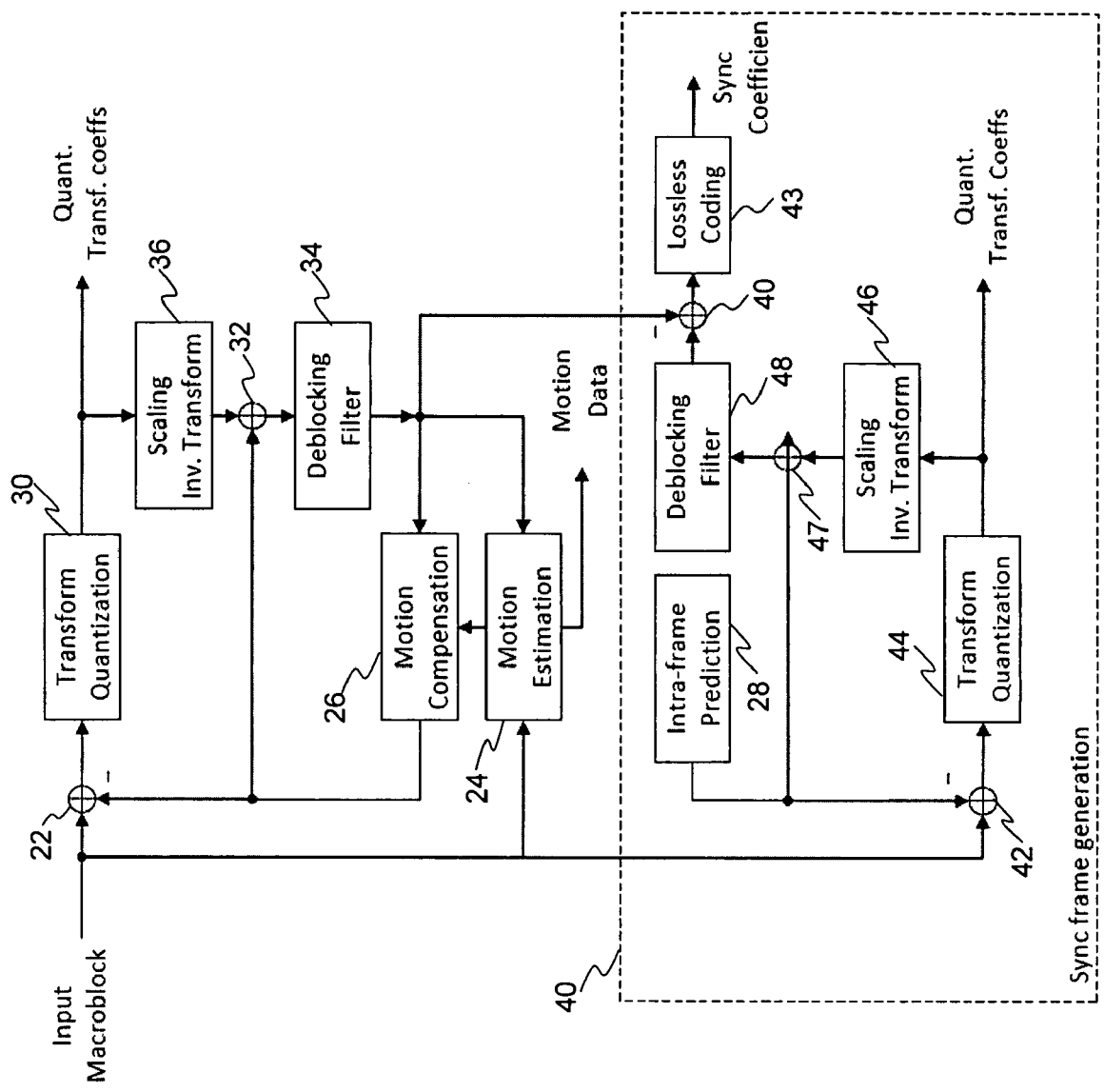
FIG. 4 is a schematic block diagram of an improved video encoder for outputting a stream as shown in FIG. 2.

An extension to the encoder for generating sync-frames according to embodiments of the present invention is shown in FIG. 4. The sync-frame can be generated using regular key-frame type intra-frame prediction encoding, plus additionally computing the difference between the decoded key-frame type frame and the corresponding inter-frame. The difference is coded lossless using an entropy code, and the outcome may be referred to herein as the sync coefficients. The quantized transformation coefficients and the sync coefficients together form the encoded sync-frame to be transmitted to the decoder. When decoded using both these sets of coefficients, the decoded sync-frame will be bitwise exact to the corresponding inter-frame.

The top-half of the diagram is substantially the same as FIG. 3, but without the intra-frame prediction module 28 being switchably coupled to the first subtraction stage 22. Instead, the output of the motion compensation module remains continually coupled to the first subtraction stage 22 and the first addition stage 32 (except perhaps for the initial key-frame 1). This part of the system thus generates the first, inter-frame stream.

A sync-frame generator 40 is then provided for generating the separate, second sync-frame stream A, B, C, etc. The sync-frame generator comprises the intra-frame prediction module 28, a second deblocking filter 48, a second subtraction stage 40, a lossless coding module 43, a third subtraction stage 42, a second transform quantization module 44, a second scaling inverse transform module 46 and a second addition stage 47. Again each of these components is preferably implemented in software stored on a memory of the transmitting terminal 102(X) and executed on a processor of that terminal, but the option is not excluded of some or all of these components being in part or in whole implemented in dedicated hardware.

An input of the third subtraction stage 42 is arranged to receive the input signal comprising the series of input macroblocks. The other input of the third subtraction stage 42 is coupled to the output of the intra-frame prediction module 28. The output of the third subtraction stage 42 is coupled to the input of the second transform quantization module 44, the output of which is arranged to supply quantized transform coefficients as part of the encoded video signal for transmission to a recipient terminal 102(Y) or 102(Z), etc. The output of the second transform quantization module 44 is also coupled to the input of the second scaling inverse transform module 46. The output of the second scaling inverse transform module 46 is coupled to the input of the second addition stage 47, and the other input of the second addition stage is coupled to the output of the intra-frame prediction module 28. The output of the second addition stage 47 is coupled to the input of the second deblocking filter 48, and the output of the second deblocking filter 48 is coupled to an input of the second subtraction stage 40. The other input of the second subtraction stage 40 is coupled to the output of the first deblocking filter 34. The output of the second subtraction stage 40 is coupled to the input of the lossless coding module 43. The output of the lossless coding module 43 is arranged to supply sync coefficients as part of the encoded video signal for transmission to the one or more recipient terminals, 102(Y), 102(Z), etc.

In operation, the third subtraction stage 42, second transform quantization module 44 and intra-frame prediction module 28 produce quantized transform coefficients as part of the encoded video signal for transmission to a recipient terminal 102(Y) or 102(Z), etc., in a similar manner to the intra-frame prediction process described above.

The quantized transform coefficients are also supplied to the input of the second scaling inverse transform module 46. Similarly to the effect of the first scaling inverse transform block 36, first addition stage 32 and first deblocking filter 34; the overall effect of the second scaling inverse transform block 46, second addition stage 37 and second deblocking filter 48 is to recreate a decoded video signal as it would appear when decoded at the recipient terminal 102(Y) or 102(Z), etc. (if only intra-frame prediction coding was used).

The second subtraction stage 40 then determined the difference between this decoded video signal comprising only the intra-frame prediction coded data and the decoded video signal of a corresponding one of the inter-frames as output from the first deblocking filter 34. The difference between the intra-frame prediction decoded frame and corresponding inter-frame is then losslessly encoded by the lossless encoding module 43. Lossless encoding means directly representing the image data of the frame, in a manner allowing exact reproduction at the decoder.

By transmitting these losslessly encoded sync coefficients along with the quantized transform coefficients, this means the sync-frame decoded using both sets of coefficients will be bit-wise exact to the corresponding one of the inter-frames.

Figure 6:
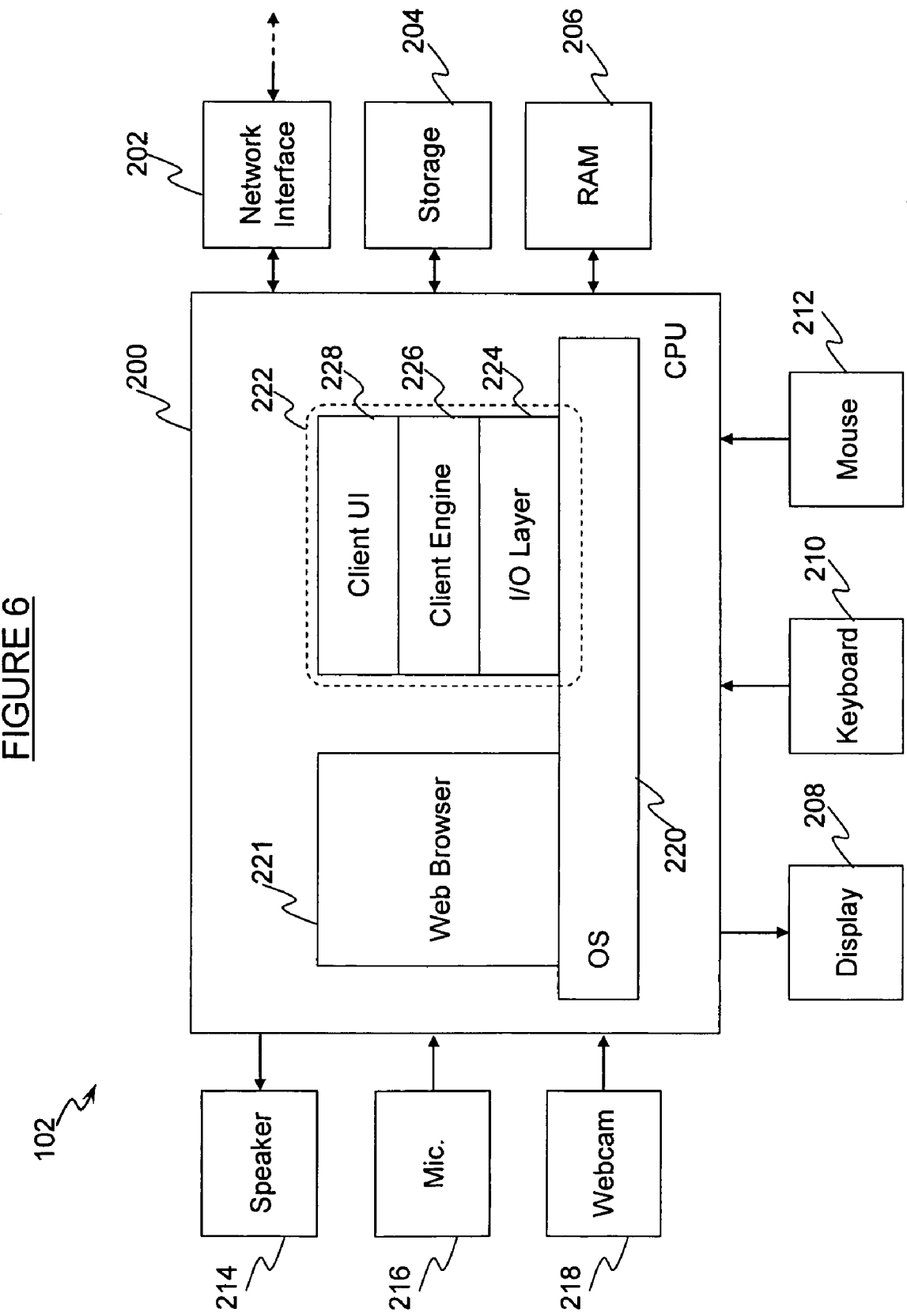
FIG. 6 is a schematic block diagram of a user terminal installed with a P2P client application.

An example application of the present invention is now described in relation to FIGS. 5 and 6.

FIG. 5 is a schematic illustration of a packet-based network such as the Internet, which comprises a plurality of interconnected elements such as those labelled 102, 104, 105 and 106. Each network element is inter-coupled with the rest of the Internet 108, and is configured to communicate data with other such elements over the Internet by transmitting and receiving data in the form of Internet Protocol (IP) packets. Each element also has an associated IP address locating it within the Internet. The elements shown explicitly in FIG. 1 are: a plurality of end-user terminals 102(A) to 102(E) such as desktop or laptop PCs or Internet-enabled mobile phones; one or more servers 104 of a communication system; one or more web servers 105; and a gateway 106 to another type of network 109 such as to a traditional Public-Switched Telephone Network (PSTN) or other circuit switched network, and/or to a mobile cellular network. However, it will of course be appreciated that many more elements make up the Internet than those explicitly shown. This is represented schematically in FIG. 1 by a communications cloud 108 which will include many other end-user terminals, servers and gateways, as well as routers of Internet service providers (ISPs) and Internet backbone routers.

Packet-based networks such as the Internet can be used to implement a number of different types of communication between end-users, such as voice-over-IP calls, video-over-IP calls, instant messaging (IM) chat sessions, and file transfer. To achieve this, each of a plurality of end-users installs and executes a client application on their respective terminal 102. The client applications together with any required functionality of server 104 form a communication system running over the Internet. Further, by communicating via a gateway to a telephone network (not shown), the system may also allow communication with other types of network such as a PSTN network in order to call a conventional fixed land-line or a mobile cellular network in order to call a mobile phone.

For example, voice or video-over-IP (VoIP) calls are beneficial to end-users because they are typically of significantly lower cost than fixed line or cellular mobile calls, often even free when from one VoIP client to another (rather than via a gateway to a telephone network). The cost savings may be particularly significant in the case of international or long-distance calls, because when communicating over the Internet using IP then the cost need not be dependent on distance.

In order to communicate with another client, the initiating client needs to know the IP address of the terminal 102 on which the other client is installed. Therefore a process of address look-up is required.

Some Internet-based communication systems are managed by an operator, in that they rely on one or more centralized, operator-run servers 104 for address look-up. In that case, when one client is to communicate with another, then the initiating client must contact a centralized server run by the system operator to obtain the callee's IP address.

In contrast to these operator managed systems, another type of Internet-based communication system is known as a "peer-to-peer" (P2P) system. The idea behind peer-to-peer (P2P) systems is to devolve responsibility away from centralized operator servers and into the end-users' own terminals. In the least, this means responsibility for address look-up is devolved to end-user terminals like those labelled 102(C) to 102(E) in FIG. 1. Each user terminal 102 runs a P2P client application, and each such terminal forms a node of the P2P system. P2P address look-up works by distributing a database of IP addresses amongst a subgroup of the end-user nodes, termed herein "supernodes". The database is a list which maps the usernames of all online or recently online users to the relevant IP addresses, such that the IP address can be determined given the username.

Each supernode acts as an IP address look-up point for a group of other nearby nodes, and its respective list contains the usernames and IP addresses of the nodes in that subgroup. The subgroup need not necessarily be "nearby" in terms of geographical location, but rather in terms of how directly connected the nodes are to the supernode (which may be related to geographical location). Each client will monitor certain factors of its respective terminal 102 such as constancy of IP address and up-time to determine whether it should become a supernode. If so, the IP address of the supernode is advertised to the client applications running on other nearby nodes, and the supernode gathers the IP addresses and usernames of those nearby nodes for its list. Then, instead of contacting a centralized server, the client on an initiating node will contact its supernode to look up the IP address of the other node. Referring to FIG. 1 for example, the client on one user node 102(C) may look up the IP address of another user node 102(D) from a further user node 102(E) which happens to have become a supernode (the user of the supernode need not be involved in the communication or be a contact of the two other users). If the contacted supernode does not have the required IP address in its list because its respective subgroup does not include said other node, then the querying node 102(C) or supernode(E) may contact one or more other supernode to find one whose subgroup does include that other node and thus determine the required address. In this way, the list mapping usernames to IP addresses is distributed amongst end-user nodes and no server is required for address look-up.

There may also be a P2P client application installed at one or more gateways 106 coupled to both the Internet 108 and one or more other networks 109 such as a PSTN network and/or a mobile cellular network. This allows the P2P client applications running on end-user terminals 102 to communicate with ordinary land-line telephones and/or mobile telephones respectively, even if those telephones themselves do not run P2P client applications and are not directly coupled to the Internet. In that case, the P2P client application on the terminal 102 sets up a connection over the Internet with the P2P client application on the gateway 106 using P2P call set-up and provides it with a phone number, and the gateway 106 uses the phone number to set up a connection with the telephone over the respective other network. Or in the other direction, a telephone user may dial into the gateway 106 with a number that identifies the user within the P2P system, and the gateway 106 will set up a connection with that user's terminal 102 over the Internet. In either case, a bidirectional communication channel can thus be established via the Internet and PSTN or mobile cellular network.

In addition to address look-up, a supplier of the P2P client application may choose to provide some additional, secondary features which in contrast to address look-up may involve a server 104. One such function is the distribution of authentication certificates which are supplied from the server 104 to the user terminals 102 when they first register with the P2P system. After initial registration, the users' clients can then exchange the certificates in order to authenticate each other without further involvement of a server. The P2P server 104 may also be used to provide some other secondary features in relation to a P2P network, such as to host contact lists and/or "avatar" images (images chosen by the users to represent themselves graphically to others of the P2P network). Nonetheless, the primary function of address look-up is still handled in a distributed fashion by end-user nodes, not by a server.

More details of address look-up in an exemplary P2P system can be found in WO 2005/009019.

VoIP or other packet-based communications can also be implemented using non-P2P systems that do use centralized call set-up and/or authentication, e.g. via a server or cellular network.

Each of the end-user terminals 102 may also be installed with other Internet-related software such as a web browser which, when executed, allows the user terminal 102 to retrieve information in the form of web pages and associated data from web servers 105 coupled to the Internet 108. This could include streaming video from a web server 105 accessed via a web page.

The schematic block diagram of FIG. 6 shows an example of an end-user terminal 102, which is configured to act as a terminal of a P2P system operating over the Internet. The terminal 102 comprises a processor or CPU 200 operatively coupled to: a network interface 202 such as modem for connecting to the Internet 108, a non-volatile storage device 204 such as a hard-drive or flash memory, and a volatile memory device such as a random access memory (RAM) 206. The terminal 102 also comprises one or more user input devices, for example in the form of a keyboard or keypad 210, a mouse 208, a microphone 216 and a webcam 218, each operatively coupled to the CPU 200. The terminal 102 further comprises one or more user output devices, for example in the form of a display screen 208 and speaker 214, again each operatively coupled to the CPU 200.

The storage device 204 stores software including at least an operating system (OS) 220, and packet-based communication software in the form of a P2P client application 222. The storage device may also store other Internet-related software such as a web-browser 221. On start-up or reset of the terminal 102, the operating system software 220 is automatically loaded into the RAM 206 and from there is run by being executed on the CPU 200. Once running, the operating system 220 can then run applications such as the web client application 221 and P2P client application 222 by loading them into the into the RAM 206 and executing them on the CPU 200. To represent this schematically in FIG. 2, the operating system 220, web client application 221 and P2P client application 222 are shown within the CPU 200.

The P2P client application 222 comprises a "stack" having three basic layers: an input and output (I/O) layer 224, a client engine layer 226, and a user interface (UI) layer 228. Each layer is responsible for specific functions. Because each successive layer usually communicates with two adjacent layers (or one in the case of the top layer), they are regarded as being arranged in a stack as shown in FIG. 6. The web client application 221 and P2P client application 222 are said to be run "on" the operating system 220. This means that in a multi-tasking environment they are scheduled for execution by the operating system 220; and further that inputs to the web client application 221 and the lowest (I/O) layer 224 of the P2P client application 222 from the input devices 202, 216 and 218 as well as outputs from web client application 221 and the I/O layer 224 of the P2P client application 222 to the output devices 202, 208 and 214 may be mediated via suitable drivers and/or APIs of the operating system 220.

The I/O layer 224 of the P2P client application comprises audio and video codecs which receive incoming encoded streams and decodes them for output to speaker 214 and/or display 208 as appropriate, and which receive unencoded audio and/or video data from the microphone 216 and/or webcam 218 and encodes them for transmission as streams to other end-user terminals 102 of the P2P system. The I/O layer 224 may also comprises a control signalling protocol for signalling control information between terminals 102 of the network.

The client engine 226 then handles the connection management functions of the P2P system as discussed above, such as establishing calls or other connections by P2P address look-up and authentication. The client engine may also be responsible for other secondary functions of the P2P system such as supplying up-to-date contact lists and/or avatar images of the user to the P2P server 104; or retrieving up-to-date contact lists of the user and retrieving up-to-date avatar images of other users from the P2P server 104. Further, the client engine may retrieve presence information from the other clients of the users in the contact list by periodically polling them via a public API, and reciprocally provide its own presence information when polled by those other clients that are online. Exchange of presence information directly between clients via a public API is the preferred option, but alternatively the presence information could be exchanged via an intermediate node such as a server 104. The presence of a user is preferably defined in part by that users themselves.

The UI layer 228 is responsible for presenting decoded video to the user via the display 208, for presenting the output on the display 208 along with other information such as presence and profile information and user controls such as buttons and menus, and for receiving inputs from the user via the presented controls.

Some different routing options are now discussed in relation to FIGS. 7a-7e.

In the example of FIG. 7a, a transmitting terminal X uses P2P connection set-up to establish separate connection with each of multiple recipient terminals such as Y and Z over the Internet 108, and transmits a separate instance of the video stream directly to each of them. One of the recipient terminals such as Z may join the stream later, and when it does requests a sync frame. This could be achieved by means of a separate request message or be implicit in the request to join the stream. If at any point after either one of the recipients Y or Z joins the stream it suffers packet-loss, it may the request one or more further sync-frames to be transmitted to it by X from the sync stream, as and when needed. But otherwise, in absence of such a request, the transmitting terminal X preferably only transmits the first, inter-frame stream.

Figure 7B:
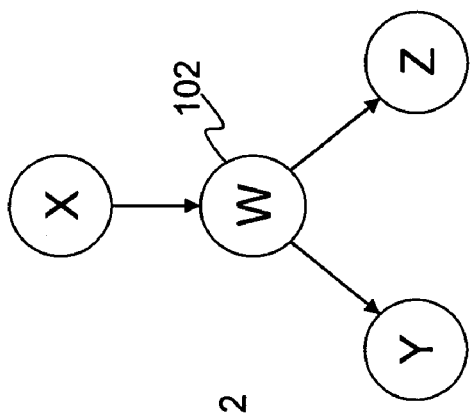

FIG. 7b gives another P2P example. Here, the transmitting terminal X sets up a single connection with another user terminal 102(W) which is to act as a multi-casting relay of the stream, and W sets up separate connections with the recipients Y and Z, all by P2P set-up. The transmitting terminal X transmits the video stream to W, and W relays instances of the stream to the recipients Y and Z. The relay terminal itself may be a recipient of the stream, or may act purely as a relay. If for example Z joins the stream after Y, it may request a sync-frame from X, either by the described connections or by another route. Further, if either Y or Z suffers packet-loss (or indeed W if it is a recipient rather than pure relay), then it may the request one or more further sync-frames to be transmitted to them by X from the sync stream generated at X.

Note that in this example, since X only transmits one instance of the stream which is then duplicated at the relay W, it is possible that a requested sync-frame will be transmitted to a recipient who does not require it due to a request from another. Nonetheless, if this happens relatively infrequently, then there is still a significant bandwidth saving over the conventional periodic key-frame approach. Alternatively the sync frame could be sent by a different route than the main inter-frame stream.

Figure 7C:
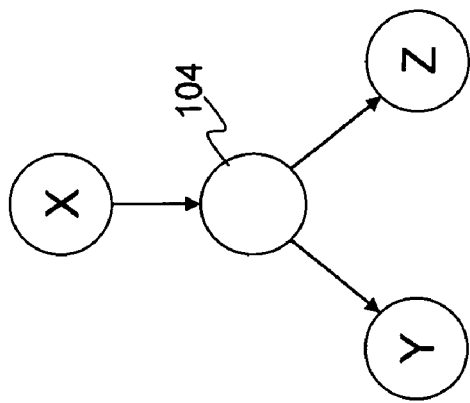

A non-P2P example is illustrated in FIG. 7c. This is similar to the example of FIG. 7b, except that a centralized server 104 is used in place of a relaying user terminal 102(W). The transmitting terminal X sets up a single connection with the server 104, and the server 104 sets up separate connections with the recipients Y and Z. The transmitting terminal X transmits the video stream to the server 104, and the server 104 relays instances of the stream to the recipients Y and Z. Again for example if Z joins the stream after Y, it may request a sync-frame from X, e.g. via the server 104. Further, if either Y or Z suffers packet-loss, then it may the request one or more further sync-frames to be transmitted to them by X from the sync stream.

Figure 7D:
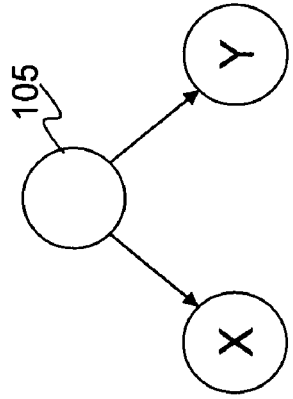

The video encoding described herein is not only applicable to transmission between end-user terminals 102 in a communication system. In the example of FIG. 7d for instance, video is streamed from a web server 105 to multiple end-user terminals such as X and Y. Each user terminal X and Y establishes a respective connection with the web server 105, and if one joins the stream late or suffers packet-loss then it may request a sync-frame to be transmitted to it by the web server 105 from a sync stream generated at the web server 105.

Figure 7E:
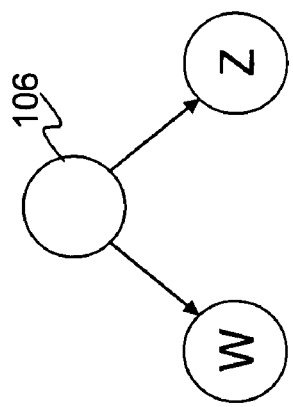

In the example of FIG. 7e, a P2P client application is running on a gateway 106 to another network. In this case another terminal (not shown) of the other network is generating the encoded video including the sync stream, and each of a plurality of user terminals such as W and Z establish a connection with the client on the gateway and thereby receive the video from the other terminal. If one joins the stream late or suffers packet-loss then it may request a sync-frame to be transmitted to it by the other terminal via the gateway 106 from a sync stream generated at the other terminal. Alternatively the client running on the gateway 106 could perform some of all of the video coding, including the possibility of generating the sync stream, in which case the sync-frames could be requested from the gateway 106.

It will be appreciated that the above embodiments have been described only by way of example.

For instance, other options for triggering request of a sync-frame by the recipient terminal may be used, e.g. one other possibility would be to request a sync frame if a user clicks or selects a control to report bad quality or artifacts.

In the embodiments described above, the encoder always generates the sync stream but only transmits the sync frames on demand as and when needed. However, in alternative embodiments the encoder could actually generate the sync frames on demand.

The sync-frames described above preferably encoded losslessly by using the sync coefficients to encode the difference between a corresponding inter-frame the sync-frame's intra-frame prediction data, but in other embodiments could instead transmit an intra-frame without this additional encoding. In less preferred embodiments, the sync-frames or such like need not necessarily be lossless or bitwise-exact to a corresponding inter-frame. Some degree of difference may be permissible, especially perhaps for short videos where propagation of errors through the video may be less of a problem.

Where it is referred to a frame, intra-frame, sync-frame, inter-frame or such like, this may refer to an image of the whole height and width of the video, but this is not necessarily the case and more generally the terms could refer to any image portion.

By inter-frame and intra-frame encoding or such like this does not necessarily mean encoded according to any specific standard. More generally, inter-frame encoding or such like means encoded relative to other image data from a preceding time, and could relate to encoding any portion of a video image from one time to a next. Intra-frame encoding could refer to any coding between portions of image data representing substantially the same moment or interval in time, using intra-frame prediction or otherwise; or indeed any alternative encoding suitable for mitigating the effect of missed or insufficient inter-frame data could be used in the role of the sync frames discussed above.

Where it is said the stream is "live" or in "real-time", this does not necessarily mean it is being viewed live or transmitted or received with the exact timing of real-life events, but more generally that some kind of "on the fly" decision or operation regarding decoding is being made at the recipient terminal as the stream arrives (as opposed to transmitting and receiving a whole encoded file then only decoding later after the whole file has been received). E.g. the stream could actually be being stored at the receiving terminal rather than being viewed live, but the invention is still applicable if the receiving terminal is performing some degree of decoding or analysis relating to decoding as the stream arrives such that it can request a sync frame where needed. That is to say, the request for the sync-frame or such like is received from the recipient during ongoing transmission of the stream—after starting transmission of the inter-frame stream but before finishing transmission. Note also that "ongoing transmission" in this sense does not mean there is no absolutely break in the data (indeed in the case of packet-loss there is a break in the received data at least), but rather during substantively ongoing transmission of the same video content.

As discussed, the present invention preferably transmits video without the periodic transmission of intra-frame encoded video data, and preferably without any extra intra-frame encoded data apart from the initial key-frame and that which is transmitted on request of the recipient. However, in embodiments this could mean only substantially without periodic or extra transmission of intra frame encoded data, in the sense that inclusion of a negligible amount of intra-frame encoded data does not extend beyond the principle of the invention. E.g. inclusion of periodic intra frame data that was too infrequent to be useful in avoiding errors would not be substantially periodic.

The decoded video could be output to any output device at the receiver, e.g. by being played via a video screen, or stored in a memory device, or relayed to another recipient.

According to certain aspects of the present invention, there may be provided a method of transmitting video to one or more recipient terminals, the method comprising: transmitting a stream of data portions each encoding image data of the video corresponding to a different respective time, the data portions of said stream including at least a sequence of first data portions each being encoded relative to a preceding one of the data portions in said stream; receiving a request signal from one or more recipient terminals of the stream; and selectively transmitting a second data portion to each of the recipient terminal in association with the stream of first data portions, the second data portion encoding image data of the video in a form decodable independently of any preceding ones of said image data portions in the stream; wherein the selective transmission comprises: in response to each of the one or more request signals, selecting to transmit a second data portion to the; and at at least another time, omitting to transmit a second data portion in absence of a request.

According to other aspects of the invention, there may be provided a method comprising: transmitting a stream of inter frame encoded video data to one or more recipient terminals; receiving a request signal from one or more of the one or more recipient terminals; and at each of a plurality of times, selecting whether to transmit intra frame encoded video data to each of the one or more recipient terminals in association with the inter frame encoded video data, and transmitting the intra frame encoded video data in accordance with the selection; wherein the selection comprises: in response to each of the one or more request signals, selecting to transmit the intra frame encoded video data to the respective recipient terminal at a corresponding one of said times; and at at least another of said times, omitting to transmit intra frame encoded video data to one of the recipient terminals in absence of a request signal from the respective recipient terminal.

Other applications and configurations of the present invention may be apparent to a person skilled in the art given the disclosure herein. The present invention is not limited by the described embodiments, but only by the appended claims.

The invention claimed is:

1. A method of transmitting video to one or more recipient terminals, the method comprising:
transmitting a stream of inter frame encoded video data to a recipient terminal;
during ongoing transmission of the stream to the recipient terminal, receiving a request signal from that recipient terminal;
in response to the request signal, transmitting intra frame encoded video data to the recipient terminal in association with the inter frame encoded video data; and
receiving a request from a further terminal to join the stream, and in response, transmitting the stream of inter frame encoded video data and an initial portion of intra frame encoded video data to the further terminal.

2. The method according to claim 1, comprising:
transmitting the stream of inter frame encoded data to multiple recipient terminals;
during ongoing transmission of the stream to the recipient terminals, receiving a respective request signal from each of those multiple recipient terminals; and
in response to each of the request signals, transmitting intra frame encoded video to the respective recipient terminal in association with the inter frame encoded video data.

3. The method according to claim 2, wherein the intra frame encoded video data is transmitted to each of the one or more recipient terminals only in response to a request signal from the respective recipient terminal and at the beginning of the stream.

4. The method according to claim 1, comprising:
during ongoing transmission of the stream to each of the one or more recipient terminals, receiving a respective plurality of request signals at different times from each of the recipient terminals; and
in response to each of those request signals, transmitting intra frame encoded video to the respective recipient terminal in association with the inter frame encoded video data.

5. The method according to claim 1, wherein the stream of inter frame encoded video data is transmitted substantially without periodic transmission of intra frame encoded video data.

6. The method according to claim 1, wherein the intra frame encoded video data is transmitted in parallel with the stream of inter frame encoded video data.

7. The method according to claim 1, wherein the request signal indicates that the respective recipient terminal has failed to receive a portion of the inter frame encoded video data.

8. The method according to claim 1, wherein the transmission of the inter frame encoded video data and the intra frame encoded video data is over a packet-based communication network.

9. The method according to claim 8, wherein the packet-based communication network comprises the internet.

10. The method according to claim 8, comprising establishing a connection with the recipient terminal over said packet-based communication network using a peer-to-peer communication system, wherein the inter frame encoded video data and intra frame encoded video data is transmitted over said peer-to-peer established connection.

11. The method of transmitting video to one or more recipient terminals, the method comprising:
transmitting a stream of inter frame encoded video data to a recipient terminal;
during ongoing transmission of the stream to the recipient terminal, receiving a request signal from that recipient terminal; and
in response to the request signal, transmitting intra frame encoded video data to the recipient terminal in association with the inter frame encoded video data, the method further comprising:
generating a first stream and parallel second stream, the first stream comprising a plurality of frames of inter frame encoded video data and no more than one frame of intra frame data, and the second stream comprising a plurality of frames of intra frame encoded video data;
wherein said transmission of the stream of inter frame encoded video data comprises transmitting the first stream, and said transmission of the intra frame encoded video data comprises transmitting selected frames of the second stream.

12. The method according to claim 11, wherein each of the frames of intra frame data in the second stream is substantially equivalent, when decoded, to a respective corresponding one of the frames of inter frame data in the first stream.

13. The method according to claim 12, wherein each of the frames of intra frame data in the second stream is bitwise exact, when decoded, to a respective corresponding one of the frames of inter frame data in the first stream.

14. The method according to claim 11, wherein there are fewer frames of the first stream per unit time than frames of the first stream.

15. A method of decoding received video, the method comprising:
  receiving a stream of inter frame encoded video data transmitted from a transiting terminal;
  during ongoing receipt of the stream from the transmitting terminal, sending a request signal to that transmitting terminal;
  in response to the request signal, receiving back alternatively encoded video data from the transmitting terminal in association with the inter frame encoded video data; and
  decoding the received video using the inter frame encoded video data in association with the alternatively encoded video data, and outputting the decoded video to an output device.

16. The method according to claim 15, wherein said alternatively encoded video data is intra frame encoded video data.

17. The method according to claim 15, wherein the sending of said request signal is trigged by failing to receive a portion of inter frame encoded data from the transmitting terminal.

18. A computer program product for transmitting video to one or more recipient terminals, the program product comprising code embodied on a non-transitory computer-readable medium and configured so as when executed on a processor to:
  transmit a stream of inter frame encoded video data to a recipient terminal;
  during ongoing transmission of the stream to the recipient terminal, receive a request signal from that recipient terminal; and
  in response to the request signal, transmit intra frame encoded video data to the recipient terminal in association with the inter frame encoded video data; and
  receive a request from a further terminal to join the stream, and in response, transmitting the stream of inter frame encoded video data and an initial portion of intra frame encoded video data to the further terminal.

19. The computer program product according to claim 18, wherein the code is configured to:
  transmit the stream of inter frame encoded data to multiple recipient terminals;
  during ongoing transmission of the stream to the recipient terminals, receive a respective request signal from each of those multiple recipient terminals; and
  in response to each of the request signals, transmitting alternatively encoded video to the respective recipient terminal in association with the inter frame encoded video data.

20. The computer program product according to claim 19, wherein the code is configured to:
  during ongoing transmission of the stream to each of the one or more recipient terminals, receive a respective plurality of request signals at different times from each of the recipient terminals; and
  in response to each of those request signals, transmit alternatively encoded video to the respective recipient terminal in association with the inter frame encoded video data.

21. The computer program product according to claim 19, wherein the code is configured to transmit intra frame encoded video data to each of the recipient terminals only in response to a request signal from the respective recipient terminal and at the beginning of the stream.

22. The computer program product according to claim 18, wherein the code is configured to transmit the stream of inter frame encoded video data substantially without periodic transmission of intra frame encoded video data.

23. A computer program product for decoding received video, the program product comprising code embodied on a non-transitory computer-readable medium and configured so as when executed on a processor to:
  receive a stream of inter frame encoded video data transmitted from a transiting terminal;
  during ongoing receipt of the stream from the transmitting terminal, send a request signal to that transmitting terminal; and
  in response to the request signal, receive back alternatively encoded video data from the transmitting terminal in association with the inter frame encoded video data; and
  decode the received video using the inter frame encoded video data in association with the alternatively encoded video data, and output the decoded video to an output device.

24. The computer program product according to claim 23, wherein the alternatively encoded video data comprises intra frame encoded video data.

25. A transmitter for transmitting video to one or more recipient terminals, the transmitter comprising:
  a transceiver arranged to transmit a stream of inter frame encoded video data to a recipient terminal and, during ongoing transmission of the stream to the recipient terminal, to receive a request signal from that recipient terminal; and
  an encoder coupled to the transceiver and configured to transmit, in response to the request signal, intra frame encoded video data to the recipient terminal in association with the inter frame encoded video data;
  the transceiver configured to receive a request from a further terminal to join the stream, and in response, transmitting the stream of inter frame encoded video data and an initial portion of intra frame encoded video data to the further terminal.

26. The transmitter according to claim 25, wherein:
  the transceiver is configured to transmit the stream of inter frame encoded data to multiple recipient terminals and, during ongoing transmission of the stream to the recipient terminals, to receive a respective request signal from each of those multiple recipient terminals; and
  the encoder is configured to transmit, in response to each of the request signals, intra frame encoded video to the respective recipient terminal in association with the inter frame encoded video data.

27. The transmitter according to claim 26, wherein:
  the transceiver is configured to, during ongoing transmission of the stream to each of the one or more recipient terminals, receive a respective plurality of request signals at different times from each of the recipient terminals; and the encoder is configured to transmit, in response to each of those request signals, intra frame encoded video to the respective recipient terminal in association with the inter frame encoded video data.

28. The transmitter according to claim 26, wherein the encoder is configured to transmit intra frame encoded video data is transmitted to each of the recipient terminals only in response to a request signal from the respective recipient terminal and at the beginning of the stream.

29. The transmitter according to claim 25, wherein transceiver is configured to transmit the stream of inter frame encoded video data substantially without periodic transmission of intra frame encoded video data.

30. A receiver for decoding received video, the receiver comprising:
   a transceiver arranged to receive a stream of inter frame encoded video data transmitted from a transiting terminal; and
   a decoder coupled to the transceiver and configured to send, during ongoing receipt of the stream from the transmitting terminal, a request signal to that transmitting terminal;
   wherein the transceiver is arranged to receive back, in response to the request signal, alternatively encoded video data from the transmitting terminal in association with the inter frame encoded video data; and
   the decoder is configured to decode the received video using the inter frame encoded video data and alternatively encoded video data, and output the decoded video to an output device.

31. The receiver according to claim 30, wherein the alternatively encoded video data is intra frame encoded video data.

32. A computer program product for transmitting video to one or more recipient terminals, the program product comprising code embodied on a non-transitory computer-readable medium and configured so as when executed on a processor to:
   transmit a stream of inter frame encoded video data to a recipient terminal;
   during ongoing transmission of the stream to the recipient terminal, receive a request signal from that recipient terminal;
   in response to the request signal, transmit intra frame encoded video data to the recipient terminal in association with the inter frame encoded video data; and
   generate a first stream and parallel second stream, the first stream comprising a plurality of frames of inter frame encoded video data and no more than one frame of intra frame data, and the second stream comprising a plurality of frames of intra frame encoded video data;
   wherein said transmission of the stream of inter frame encoded video data comprises transmitting the first stream, and said transmission of the intra frame encoded video data comprises transmitting selected frames of the second stream.

33. A transmitter for transmitting video to one or more recipient terminals, the transmitter comprising:
   a transceiver arranged to transmit a stream of inter frame encoded video data to a recipient terminal and, during ongoing transmission of the stream to the recipient terminal, to receive a request signal from that recipient terminal; and
   an encoder coupled to the transceiver and configured to transmit, in response to the request signal, intra frame video data to the recipient terminal in association with the inter frame encoded video data, the encoder configured to:
   generate a first stream and parallel second stream, the first stream comprising a plurality of frames of inter frame encoded video data and no more than one frame of intra frame data, and the second stream comprising a plurality of frames of intra frame encoded video data;
   wherein said transmission of the stream of inter frame encoded video data comprises transmitting the first stream, and said transmission of the intra frame encoded video data comprises transmitting selected frames of the second stream.

* * * * *

UNITED STATES PATENT AND TRADEMARK OFFICE
CERTIFICATE OF CORRECTION

| | |
|---|---|
| PATENT NO. | : 8,213,506 B2 |
| APPLICATION NO. | : 12/584579 |
| DATED | : July 3, 2012 |
| INVENTOR(S) | : David Zhao |

Page 1 of 1

It is certified that error appears in the above-identified patent and that said Letters Patent is hereby corrected as shown below:

In the Claims

In column 17, line 32, In Claim 17, delete "trigged" and insert -- triggered --, therefor.

Signed and Sealed this
Twenty-fourth Day of February, 2015

Michelle K. Lee
*Deputy Director of the United States Patent and Trademark Office*